United States Patent [19]

Bagepalli et al.

[11] Patent Number: 5,586,773
[45] Date of Patent: Dec. 24, 1996

[54] GAS-PATH LEAKAGE SEAL FOR A GAS TURBINE MADE FROM METALLIC MESH

[75] Inventors: Bharat S. Bagepalli, Schenectady; Osman S. Dinc, Troy, both of N.Y.

[73] Assignee: General Electric Company, Schenectady, N.Y.

[21] Appl. No.: 491,758

[22] Filed: Jun. 19, 1995

[51] Int. Cl.$^6$ ............................................. F16J 15/12
[52] U.S. Cl. .................. 277/167.5; 277/230; 277/236; 415/173.7; 415/174.2
[58] Field of Search ....................... 277/167.5, 230, 277/233, 236; 415/170.1, 173.6, 173.7, 174.2

[56] References Cited

U.S. PATENT DOCUMENTS

| | | |
|---|---|---|
| 271,390 | 1/1983 | Woodruff . |
| 625,155 | 5/1899 | Dresser . |
| 2,194,266 | 7/1937 | Allen . |
| 2,587,057 | 2/1952 | McVeigh ............................ 415/173.7 |
| 3,113,526 | 12/1963 | Paschke . |
| 3,271,039 | 9/1966 | Kohl et al. . |
| 3,754,766 | 8/1973 | Asplund ............................. 277/236 |
| 3,970,318 | 7/1976 | Tuley . |
| 4,415,309 | 11/1983 | Atterbury . |
| 4,626,002 | 12/1986 | Hagemeister et al. . |
| 4,645,217 | 2/1987 | Honeycutt et al. . |
| 4,730,876 | 3/1988 | Werner et al. . |
| 4,854,600 | 8/1989 | Halling et al. ..................... 277/236 |
| 4,932,207 | 6/1990 | Harris ................................ 415/174.2 |
| 5,104,286 | 4/1992 | Donlan . |
| 5,221,096 | 6/1993 | Heldreth et al. . |
| 5,265,412 | 11/1993 | Bagepalli et al. . |
| 5,366,625 | 11/1994 | Pedersen et al. . |
| 5,509,669 | 4/1996 | Wolfe et al. ....................... 415/174.2 |

FOREIGN PATENT DOCUMENTS 0135653  6/1988  Japan .

OTHER PUBLICATIONS

Sales Brochure from Unique Wire Weaving Co., Inc. (17 pages).

Primary Examiner—Scott Cummings
Attorney, Agent, or Firm—Douglas E. Erickson; Marvin Snyder

[57] ABSTRACT

A gas-path leakage seal for generally sealing a gas-path leakage-gap between spaced-apart first and second members of a gas turbine (such as combustor casing segments). The seal includes a cloth-layer assemblage positioned in the leakage-gap. The cloth-layer assemblage includes a metallic, woven cloth layer having a first group of generally equal-diameter warp wires and a second group of generally equal-diameter weft wires. Adjacent wires of one of the first and second groups of wires are spaced apart by a center-to-center distance equal to generally between four and ten times the diameter of the wires of the other of the first and second groups of wires.

10 Claims, 1 Drawing Sheet

5,586,773

GAS-PATH LEAKAGE SEAL FOR A GAS TURBINE MADE FROM METALLIC MESH

BACKGROUND OF THE INVENTION

The present invention relates generally to gas turbines, and more particularly to a gas-path leakage seal for a gas turbine.

Gas turbines include, but are not limited to, gas turbine power generation equipment and gas turbine aircraft engines. A gas turbine has a gas path which typically includes, in serial-flow relationship, an air intake (or inlet), a compressor, a combustor, a turbine, and a gas outlet (or exhaust nozzle). Gas leakage, either out of the gas path or into the gas path, from an area of higher pressure to an area of lower pressure is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between gas turbine subassemblies such as through gaps between the combustor and the turbine, and gas-path leakage occurs through gaps between the components that make up a gas turbine subassembly, such as through gaps between combustor casing segments. Such components and subassemblies have surfaces of different shapes, suffer from assembly misalignment, and undergo vibration. Hot-section components thermally experience hot gas flow and typically undergo different thermal growths. Conventional seals are used to reduce such leakage. For example, a conventional rigid or leaf seal made of metal may have a leakage of 2.4% (primarily from flow around the seal due to different surface shapes, assembly misalignment, vibration, thermal growth, and/or wear). Such leakage in the combustor may result in a 15 (or much higher) parts-per-million (ppm) NOx production and a similar CO production. What is needed is an improved gas-path leakage seal for a gas turbine which will further increase efficiency and further decrease pollution, such as further decreasing NOx and CO production.

SUMMARY OF THE INVENTION

It is an object of the invention to provide a gas-path leakage seal for a gas turbine.

The gas-path leakage seal of the invention is for generally sealing a gas-path leakage-gap between spaced-apart first and second members of a gas turbine. The seal includes a cloth-layer assemblage placed in the gas-path leakage-gap. The cloth-layer assemblage includes a metallic, woven cloth layer having a first group of generally equal-diameter wires which are warp wires and a second group of generally equal-diameter wires which are weft wires. Adjacent wires of one of the first and second groups of wires are spaced apart by a center-to-center distance equal to generally between four and ten times the diameter of the wires of the other of the first and second groups of wires.

Preferably, the number of wires per inch of the other of the first and second groups of wires is at least generally eight times the number of wires per inch of the one of the first and second groups of wires. In an exemplary embodiment, the cloth layer has two generally opposing surfaces, and one of the surfaces is at least partially superimposed against a corresponding portion of the first member. In a preferred embodiment, the gas-path leakage-gap has a predominant leakage direction within the placed cloth layer proximate the corresponding portion of the first member, and the wires of the one of the first and second groups of wires are aligned generally along the predominant leakage direction. In a preferred construction, the cloth layer is a twilled cloth layer, and the wires of the first and second groups of wires each consist essentially of a cobalt-based super-alloy.

Several benefits and advantages are derived from the invention. The metallic, woven cloth layer of the seal offers some sealing, good wear resistance, and good flexibility. Good flexibility means the seal is very compliant and can accommodate surfaces of different shapes, assembly misalignment, vibration, and differential thermal growth. Overall sealing is improved when a twilled cloth layer is employed. Sealing along the predominant leakage direction within the placed cloth layer typically is improved when the wires of the one of the first and second groups of wires are aligned generally along the predominant leakage direction. It is expected that such improved gas-path leakage using the seal of the invention will result in a corresponding lower NOx and CO production.

BRIEF DESCRIPTION OF THE DRAWINGS

The accompanying drawings illustrate two preferred embodiments of the present invention wherein.

DETAILED DESCRIPTION OF THE INVENTION

Figure 1:
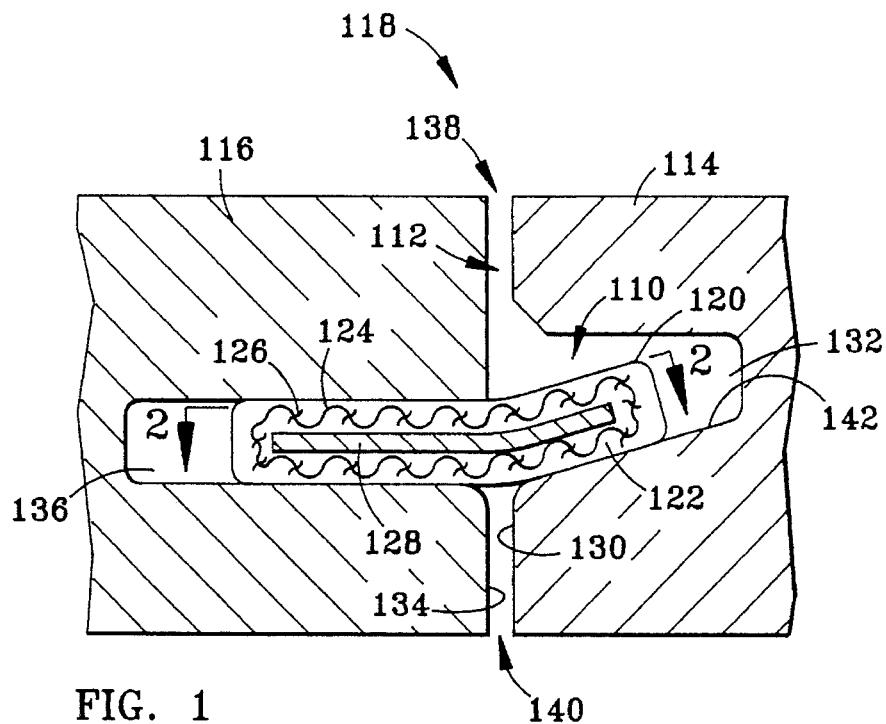
FIG. 1 is a schematic cross-sectional view of a first preferred embodiment of the seal of the present invention wherein the seal is installed in two slots and wherein the seal includes an optional metal-foil layer enclosingly surrounded by the metallic, woven cloth layer of the seal.
Figure 2:
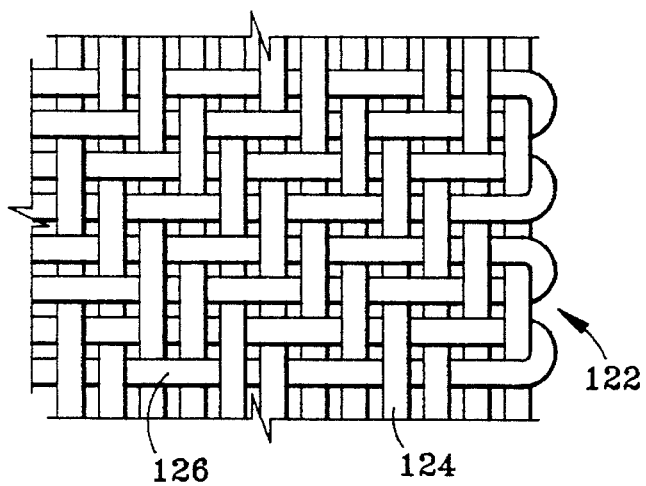
FIG. 2 is a schematic planar view of the metallic, woven cloth layer of the seal of FIG. 1, taken along lines 2—2 of FIG. 1, wherein the metallic, woven cloth layer has a twilled weave.

Referring now to the drawings, wherein like numerals represent like elements throughout, FIGS. 1 and 2 schematically show a first preferred embodiment of the gas-path leakage seal 110 of the present invention. The gas-path leakage seal 110 is for generally sealing a gas-path leakage-gap 112 between spaced-apart first and second members 114 and 116 of a gas turbine 118 (only a small portion of which is shown in FIG. 1). Preferably, the first and second members 114 and 116 are members of a gas turbine combustor. In an exemplary embodiment, the first and second members 114 and 116 are members (e.g., first and second segments) of a gas turbine combustor casing.

The seal 110 includes a cloth-layer assemblage 120 disposed in the gas-path leakage-gap 112. The cloth-layer assemblage 120 includes a metallic, woven cloth layer 122 having a first group of generally equal-diameter wires 124 which are warp wires and a second group of generally equal-diameter wires 126 which are weft wires. Adjacent wires of one of the first and second groups of wires 124 and 126 are spaced apart by a center-to-center distance equal to generally between four and ten times the diameter of the wires of the other of the first and second groups of wires 124 and 126. This requirement covers two cases. In the first case, the one of the first and second group of wires 124 and 126 is chosen as the first group of wires 124 (i.e., the warp wires), and the other of the first and second group of wires 124 and 126 is chosen as the second group of wires 126 (i.e., the weft wires). In the second case, the one of the first and second groups of wires 124 and 126 is chosen as the second group of wires 126 (i.e., the weft wires), and the other of the first and second group of wires 124 and 126 is chosen as the first group of wires 124 (i.e., the warp wires). Applicants have found that wire spacing which is less than the minimum of the recommended range tends to reduce sealing because it tends to require excessive bending and looping of the wires that are perpendicular to the spaced wires which increases the size of the leakage path, and wire spacing which is greater than the maximum of the recommended range tends to reduce sealing because the structural integrity of the metallic, woven cloth layer 122 is compromised and because the wires which are perpendicular to the spaced wires tend to deflect and buckle which increases the size of the leakage path. In an exemplary embodiment, the number of wires per inch of the other of the first and second groups of wires 124 and 126 is at least generally eight times the number of wires per inch of the one of the first and second groups of wires 124 and 126. Applicants have found that wire-packing which is less than the recommended minimum value tends to reduce sealing because it increases the size of the leakage path. It is noted that the cloth-layer assemblage 120 may comprise at least two (and preferably no more than two) overlying layers of cloth (not shown). In a preferred construction, the metallic, woven cloth layer 122 is a twilled cloth layer, as shown in FIG. 2, and the wires of the first and second groups of wires 124 and 126 each consist essentially of a high-temperature, cobalt-based super-alloy, such as L-605. Applicants have found that a twilled weave typically provides generally three times better sealing than a plain weave.

Seal 110 includes an optional generally imperforate metallic-foil-layer assemblage 128, as shown in FIG. 1, which the cloth-layer assemblage 120 generally surrounds and generally enclosingly contacts. The metallic-foil-layer assemblage 128 of seal 110 comprises at least one layer of foil (as shown in FIG. 1). The metallic-foil-layer assemblage 128 may comprise at least two superimposed and preferably identical layers of foil (not shown) having staggered slots for added flexibility. Preferably, the metallic-foil-layer assemblage 128 has no more than four layers of foil and has a thickness of generally between five and ten thousandths of an inch with each foil layer comprising the high-temperature, cobalt-based super-alloy known as L-605. In an exemplary embodiment, the seal 110 also includes a weldment (not shown) permeating the cloth-layer assemblage 120 attaching together the metallic-foil-layer assemblage 128 and the second member 116. It is noted that weld includes (without limitation) braze, and that braze includes (without limitation) solder. In certain applications (not shown), an edge of the metallic-foil-layer assemblage 128 may protrude through the cloth-layer assemblage 120 and resiliently contact the first member 114 or a weld-bead may permeate the cloth-layer assemblage 120, be attached to the metallic-foil-layer assemblage 128 proximate the edge, and unattachedly contact the first member 114.

In a first preferred seal installation, as shown in FIG. 1, the first member 114 has a first surface 130 with a first slot 132, and the second member 116 has a second surface 134 with a second slot 136 generally opposing the first slot 132. The cloth-layer assemblage 120 is disposed within the first and second slots 132 and 136 spanning the gas-path leakage-gap 112. The gas-path leakage-gap 112 has a higher-pressure end 138 and a lower-pressure end 140. Preferably, the first slot 132 has a slot wall surface 142 generally facing the higher-pressure end 138 and inclined toward the second surface 134. In an exemplary embodiment (not shown), the edge of the metallic-foil-layer assemblage 128 is exposed through the cloth-layer assemblage 120 and is bent toward the slot wall 142. Such a design uses the high pressure to help seat the seal 110 and the exposed edge of the foil-layer assemblage 128 against the slot wall 142 of the first member 114. In a second preferred seal installation (not shown), the first slot 132 is eliminated, the opening of the second slot 136 tilts towards the higher-pressure end 138, and the non-slotted end of the cloth-layer assemblage 120 contacts the first surface 130 of the first member 114.

Figure 3:
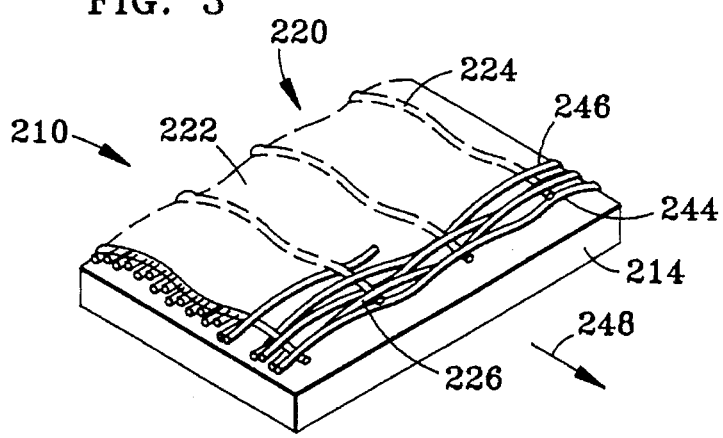
FIG. 3 is a schematic perspective view of a second preferred embodiment of the seal wherein the metallic, woven cloth layer has a plain weave and wherein the seal lacks the optional metal-foil layer.

FIG. 3 schematically shows a second preferred embodiment of the gas-path leakage seal 210 of the present invention. Seal 210 is identical to seal 110 of the previously-described first preferred embodiment with differences as hereinafter noted. Seal 210 lacks the metallic-foil-layer assemblage 128 of seal 110. Instead of the "wrapped-around" metallic, woven cloth-layer 122 of seal 110, the metallic, woven cloth layer 222 of seal 210 is not folded upon itself. Preferably, the cloth layer 222 has two generally opposing surfaces 244 and 246, wherein one of the surfaces 244 is at least partially superimposed against a corresponding portion of the first member 214. Gas leakage blowing through the cloth-layer assemblage 220 will be stopped by the first member 214 and turned to flow within the cloth-layer assemblage 220 itself.

Typically, because of the particular seal installation used, the gas-path leakage-gap has a predominant leakage direction 248 within the disposed cloth layer 222 proximate the corresponding portion of the first member 214. Applicants have found that leakage within the cloth layer 222 is different for different directions, with leakage along the direction of the first group of wires 224 typically being the smallest and with leakage along the direction of the second group of wires 226 typically being the greatest. Therefore, leakage within the cloth layer of an installed seal 210 may be further reduced by proper orientation of the weave of the cloth layer 222. Thus, it is preferred that the wires of the one of the first and second groups of wires 224 and 226 are aligned generally along the predominant leakage direction 248.

In a first cloth-layer construction tested by Applicants, the diameter of the wires of the first and second groups of wires was generally 7 mils, there were generally 30 wires per inch of the one of the first and second groups of wires 224 and 226, and there were generally 250 wires per inch of the other of the first and second groups of wires 224 and 226. With a cloth-layer thickness of generally 0.027 inch, the leakage within the cloth layer 222 was equivalent to that of: a 0.65 mil gap along the direction of the other of the first and second groups of wires 224 and 226; a 0.3 mil gap along the direction of the one of the first and second groups of wires 224 and 226; and a 0.5 mil gap along the diagonal.

In a second cloth-layer construction tested by Applicants, the diameter of the wires of the one of the first and second groups of wires was generally 10 mils, the diameter of the wires of the other of the first and second groups of wires 224 and 226 was generally 8 mils, there were generally 20 wires per inch of the one of the first and second groups of wires 224 and 226, and there were generally 250 wires per inch of the other of the first and second groups of wires 224 and 226. With a cloth-layer thickness of generally 0.025 inch, the leakage within the cloth layer 222 was equivalent to that of:

a 0.55 mil gap along the direction of the other of the first and second groups of wires 224 and 226; a 0.4 mil gap along the direction of the one of the first and second groups of wires 224 and 226; and a 0.5 mil gap along the diagonal.

Applicants also found that leakage within the seal 210 was improved if the seal 210 had the surfaces 244 and 246 of the cloth layer 222 pressed together to more tightly pack the weave.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A gas-path leakage seal for generally sealing a gas-path leakage-gap between spaced-apart first and second members of a gas turbine, said seal comprising a cloth-layer assemblage disposed in said gas-path leakage-gap and including a metallic, woven cloth layer having a first group of generally equal-diameter wires which are warp wires and a second group of generally equal-diameter wires which are weft wires, wherein adjacent wires of one of said first and second groups of wires are spaced apart by a center-to-center distance equal to generally between four and ten times the diameter of the wires of the other of said first and second groups of wires.

2. The seal of claim 1, wherein the number of wires per inch of said other of said first and second groups of wires is at least generally eight times the number of wires per inch of said one of said first and second groups of wires.

3. The seal of claim 2, wherein said cloth layer has two generally opposing surfaces, and wherein one of said surfaces is at least partially superimposed against a corresponding portion of said first member.

4. The seal of claim 3, wherein said gas-path leakage-gap has a predominant leakage direction within said disposed cloth layer proximate said corresponding portion of said first member, and wherein the wires of said one of said first and second groups of wires are aligned generally along said predominant leakage direction.

5. The seal of claim 4, wherein said cloth layer is a twilled cloth layer.

6. The seal of claim 5, wherein the diameter of the wires of said first and second groups of wires is generally 7 mils, and wherein there are generally 30 wires per inch of said one of said first and second groups of wires and there are generally 250 wires per inch of said other of said first and second groups of wires.

7. The seal of claim 5, wherein the diameter of the wires of said one of said first and second groups of wires is generally 10 mils and the diameter of the wires of said other of said first and second groups of wires is generally 8 mils, and wherein there are generally 20 wires per inch of said one of said first and second groups of wires and there are generally 250 wires per inch of said other of said first and second groups of wires.

8. The seal of claim 5, wherein the wires of said first and second groups of wires each consist essentially of a cobalt-based super-alloy.

9. The seal of claim 5, wherein said first and second members are members of a gas turbine combustor.

10. The seal of claim 9, wherein said first and second members are members of a gas turbine combustor casing.

\* \* \* \* \*